United States Patent [19]

Clifft

[11] 4,413,692
[45] Nov. 8, 1983

[54] POWER ASSISTING DEVICE FOR A MANUALLY OPERABLE VEHICLE

[76] Inventor: Dale L. Clifft, 13530 Herron St., Sylmar, Calif. 91342

[21] Appl. No.: 310,798

[22] Filed: Oct. 13, 1981

[51] Int. Cl.³ ............................................. B62M 7/14
[52] U.S. Cl. ...................................... 180/11; 280/204
[58] Field of Search .......................... 180/11, 210, 231; 280/204, 239

[56] References Cited

U.S. PATENT DOCUMENTS

| | | | |
|---|---|---|---|
| 2,458,720 | 1/1949 | Mertz | 180/231 |
| 2,493,287 | 1/1950 | Hatfield | 180/231 |
| 2,552,846 | 5/1951 | Dinkins, Jr. | 180/11 |
| 3,934,666 | 1/1976 | Ellington | 180/11 |

Primary Examiner—Joseph F. Peters, Jr.
Assistant Examiner—Donn McGiehan
Attorney, Agent, or Firm—Jack C. Munro

[57] ABSTRACT

A power assisting device for manually operated vehicles, such as a bicycle, which takes the form of a motor which rotatably drives a driving wheel. The motor is mounted on a mounting frame. The mounting frame is connected through a linkage assembly to the frame of the bicycle. The driving wheel is connected by a suspension system to the mounting frame so that relative movement can occur between the driving wheel and the frame. The transmission of power between the motor to the driving wheel is accomplished through a pair of driving belts which are connected through an idler pulley. The idler pulley is mounted through a automatic belt tensioning device to the mounting frame.

6 Claims, 7 Drawing Figures

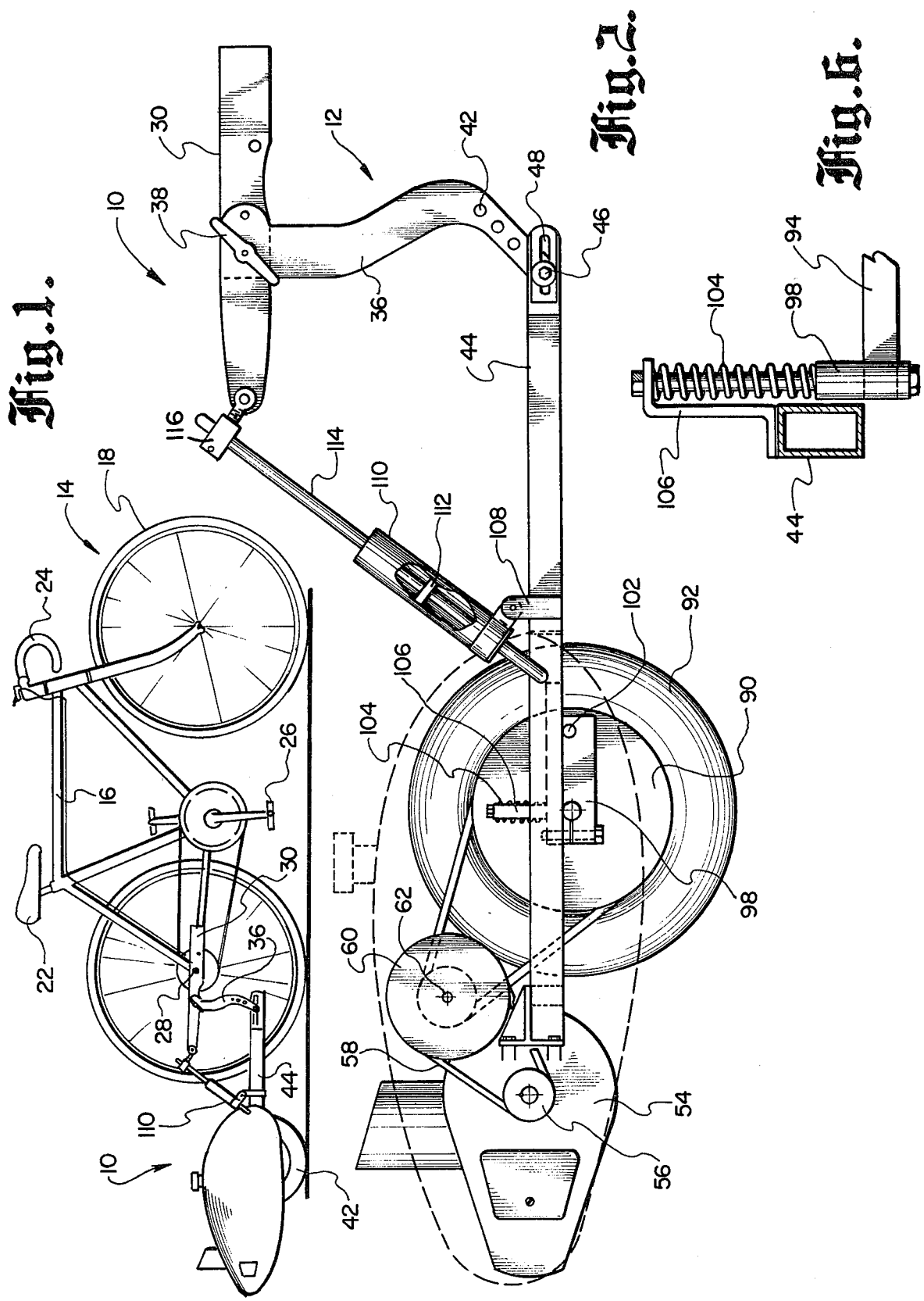

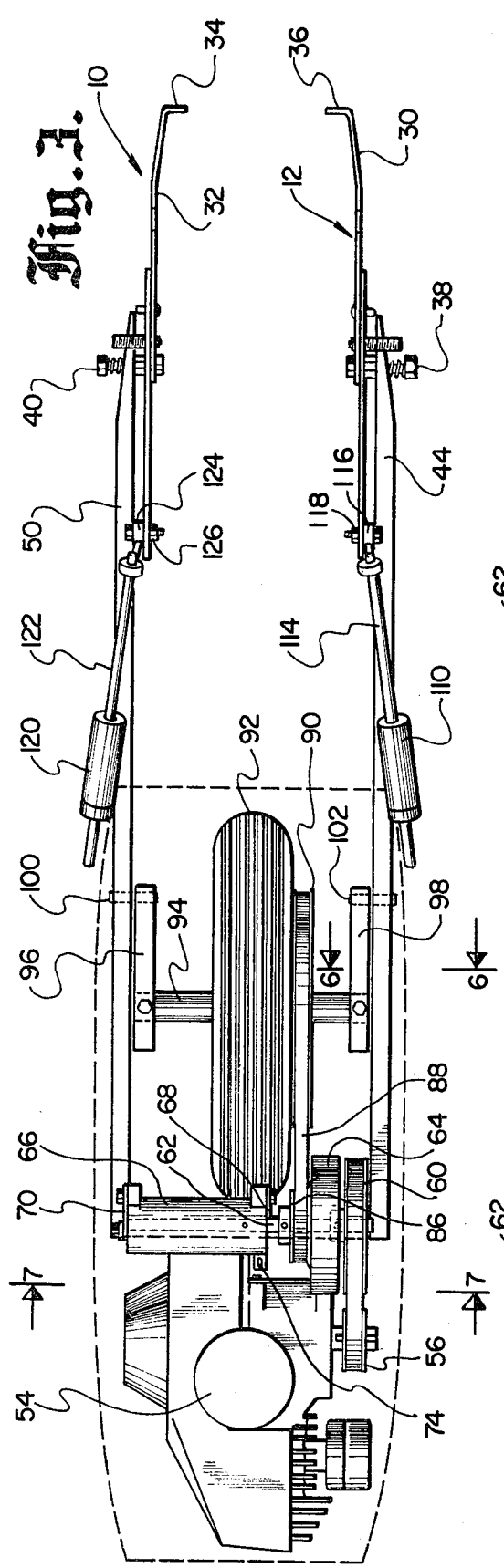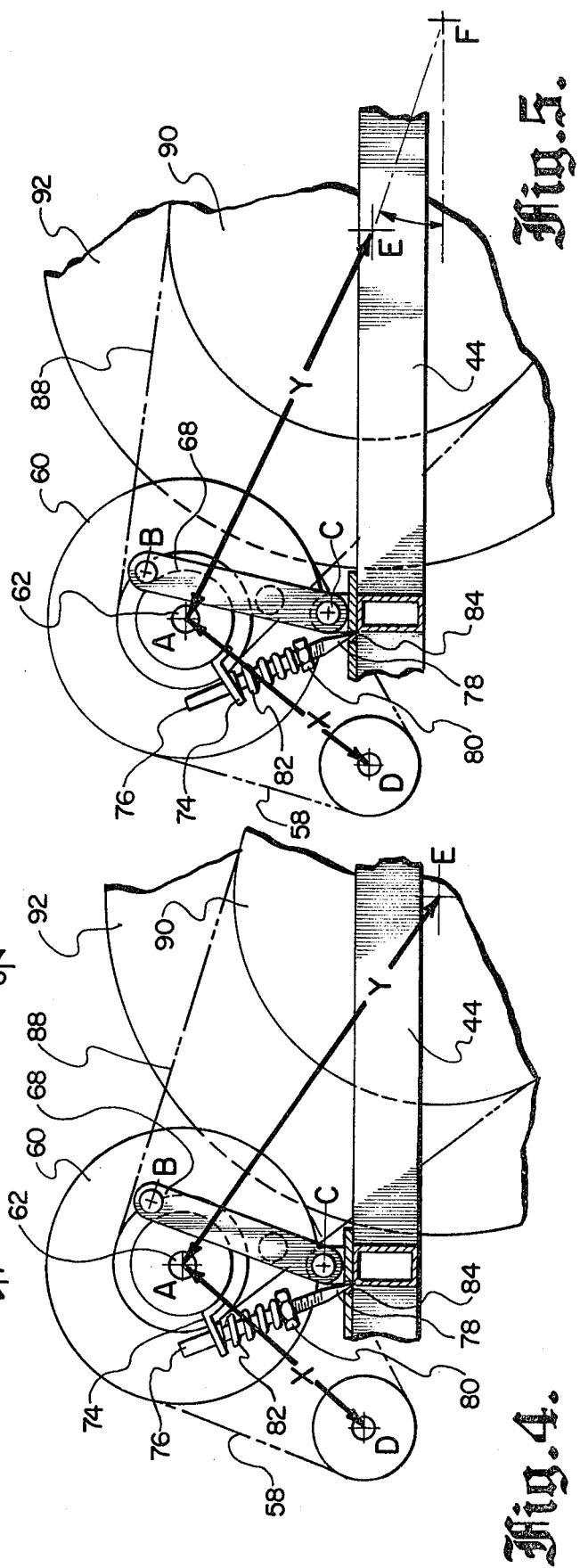

POWER ASSISTING DEVICE FOR A MANUALLY OPERABLE VEHICLE

REFERENCE TO PRIOR APPLICATION

This application is an improvement on the structure defined in U.S. Pat. No. 4,346,772, issued Aug. 31, 1982, by the same inventor.

BACKGROUND OF THE INVENTION

Energy conservation has caused people to rely more on bicycles than on fuel burning vehicles, such as motorcycles. However, for a substantial number of people, especially people of middle age or older, the bicycle is difficult to operate as well as being a slow mode of transportation.

In order to overcome the above difficulties, it has been common to construct a light weight motorcycle which includes a small power assisting motor. These types of light weight motorcycles are generally referred to as "mopeds." The vehicle is manually operated through a series of pedals, similar to a bicycle, with the motor for the purpose of adding additional power. A "moped's" speed is usually limited to less than thirty miles per hour, which is usually adequate speed for short distance traveling.

At the present time, for one that has a bicycle and that individual wishes to acquire a "moped," that individual must buy another separate vehicle. It would be most desirable to provide, at a substantially lower cost, a power assisting device which would accomplish the objectives of the "moped," which would be mounted in conjunction with the bicycle thereby eliminating the need for the purchase of a completely separate vehicle.

Previously, such designs for power assisting devices for a bicycle have encountered certain undesirable effects. The device must be able to quickly compensate for bounce since the roadway that the vehicle will be traveling on will not be perfectly smooth. Additionally, the previous types of devices have been rather noisy. The previous devices have employed the use of a chain drive mechanism. A belt type of drive would be far more quiet in operation. However, belt types of drives have certain inherent disadvantages, such as the belts stretching which requires periodic tightening of the belt or replacement. In order to obtain the advantage of the quieter operated belt assembly, there is a need for a device which will compensate for wear and stretch and keep the belt assembly taut at all times. Also, such a device could function to keep the belt assembly taut during the time that the driving wheel is bouncing.

SUMMARY OF THE INVENTION

The power assisting device of this invention takes the form of a motor which is fixed onto a mounting frame. The motor will normally be powered by a liquid fuel, such as gasoline. The motor rotates a drive pulley which through a belt rotates an idler pulley. A second belt is connected between the idler pulley and a drive wheel. The idler pulley is movable with respect to the frame so that each of the belts are maintained taut. The idler pulley is under a continuous biasing force tending to locate the idler pulley at its furtherest displaced position from the mounting frame. The drive wheel is mounted on an arm assembly. The arm assembly is pivotally attached to the mounting frame forming a pivot axis which is spaced from the rotational axis of the drive wheel. As a result, the drive wheel is capable of a limited amount of movement relative to the mounting frame to accommodate for irregularities in the road surface. As the pivotable arm assembly moves, it works against a spring assembly which exerts a continuous bias against the arm assembly tending to locate the driving wheel at its lowermost position with respect to the mounting frame. The lowermost position is defined in the direction toward the road's surface. A bounce control in the form of a damping mechanism is mounted between the frame of the bicycle and the mounting frame of the power assisting device. The damping mechanism takes the form of a pair of fluid dampers wherein within each damper there is a piston movable within a cylinder. Each piston is attached to a piston rod. The position of attachment of each piston rod to the frame of the bicycle is to be adjustable so as to accommodate for different variations of installation.

One objective of this invention is to construct a power assisting device for a bicycle which can be readily attached and detached from the bicycle therey permitting the bicycle to be used solely as a bicycle or a power assisted bicycle.

One of the primary objectives of this invention is that the power assisting device is operated through a belt assembly which substantially diminishes operating noise during usage of the device.

Another primary advantage of this invention is that there is incorporated a belt tensioning device which automatically adjusts for wear and bouncing movement of the drive wheel to keep the driving belts taut at all times. There should never be a need for maintenance of this belt tensioning device during normal usage of the power assisting device.

Another advantage of this invention is that the power assisting device is located separate from the bicycle which means that there is no altering of the bicycle frame which could cause weakening of the frame, nor is the bicycle subject to vibration or contamination by gasoline or oil.

Another advantage of the present invention is that the bicycle itself has a higher silhouette in traffic than a "moped" and therefore safer.

Another advantage of this invention is that by use of the damper assembly to control bounce, sideways oscillation is also controlled and bicycle vibration, which can be deleterious to handling, is minimized.

BRIEF DESCRIPTION OF THE DRAWINGS

FIG. 1 is a side elevational view of a bicycle to which has been attached the power assisting device of this invention;

FIG. 2 is an enlarged, diagrammatic side elevational view showing more clearly the internal components of the power assisting device of this invention;

FIG. 3 is a top plan view of the structure shown in FIG. 2;

FIG. 4 is a diagrammatic view showing the belt tightening apparatus of this invention with the driving wheel in its lowermost position;

FIG. 5 is a view similar to FIG. 4, but showing the wheel in an upper position which would occur during bounce of the wheel;

FIG. 6 is a view partially in cross-section taken along line 6—6 of FIG. 3 showing the spring mounting arrangement which assists in damping of the bounce energy of the driving wheel.

DETAILED DESCRIPTION OF THE SHOWN EMBODIMENT

Figure 7:
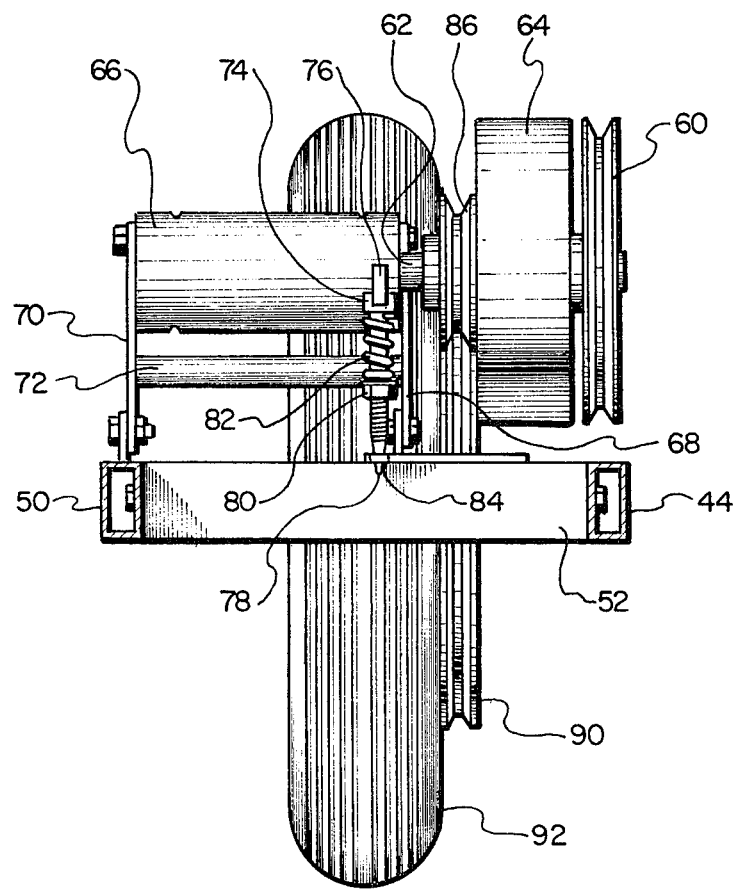
FIG. 7 is a back view of the belt tensioner apparatus taken along line 7—7 of FIG. 3.

Referring particularly to the drawings, there is shown the power assisting device 10 of this invention. The device 10 includes a linkage assembly 12 to connect the device 10 to a bicycle 14. The bicycle 14 is deemed to be conventional being constructed generally of a frame 16, a front wheel 18 and a rear wheel 20. Mounted on the frame 16 is a seat 22 and a handle bar assembly 24. The bicycle is normally operated through the use of the pedal assembly 26.

Attached to the rear axle 28 of the rear wheel 20 are linkage arms 30 and 32. The arms 30 and 32, respectively, have inwardly turned ends 34 and 36 which are to connect with a portion of the frame 16 forward of the axle 28.

Arm 30 is connected intermediate its ends to a link 36. Similarly, the arm 32 is connected to a link (not shown). The connection between the link 36 and the arm 30 is through use of a fastener assembly 38. A similar fastener assembly 40 connects the arm 32 to its respective link.

The free outer end of the link 36 includes a series of holes 42. The holes 42 are for the reason of adjustability in the connecting of the arm 42 to first frame member 44 of the mounting frame of the power assisting device 10. A bolt and nut fastener assembly 46 is to extend through slot 48 of the first frame member 44 and connect with one of the openings 42. It is to be understood that a similar type of connection is to occur between the link (not shown) on the opposite side of the bicycle 14 which is connected in a similar manner to the second frame member 50. The frame member 50 is located substantially parallel to the frame member 44.

The frame members 50 and 44 are connected together at their outermost ends by a cross-brace 52. The motor and fuel tank assembly 54 are mounted to the mounting frame at the cross brace 52. The motor 52 rotates a drive pulley 56 which connects with a first drive belt 58. The drive belt 58 is connected to an idler pulley 60. The idler pulley is mounted on an idler pulley shaft 62. Actually, the connection of the pulley 60 to the shaft 62 is through the use of a centrifugal clutch assembly 64.

The shaft 62 is mounted within a sleeve housing 66. The inner end of the sleeve housing 66 is fixedly attached to an arm 68. The outer end of the sleeve housing 66 is fixedly attached to an arm 70. The arms 68 and 70 are connected together through a cross tube 72. The cross tube 72 is to function as a stiffener to form as an integral unit the arm 70 with the arm 68. The overall configuration of the arms 68 and 70 and the tube 72 is substantially that of an H shape.

The outer free end of the arms 68 and 70 are fixedly connected to the mounting frame and particularly to cross brace 52 of the mounting frame.

It is to be noted that the sleeve housing 66 is capable of pivoting movement with respect to the arm 68 and 70. Extending outwardly from the sleeve housing 66 is a flange 74. There is a hole formed in the flange 74 and through it extends a pin 76. The lower end of the pin 76 is threaded, with the lowermost end being sharpened forming pointed end 78. A nut 80 is threadably engaged with the threaded section of the pin 76. Extending about the pin 76 in between the flange 74 and the nut 80 is a coil spring 82. It is to be noted that the position of the pin 76 is fixed relative to the flange 74. This means that the length of the pin 76 from the flange 74 to the pointed end 78 remains constant. The pointed end 78 is to connect with a hole 84 formed in the cross brace 52. This is merely for purposes of alignment and to provide a seat for the pin 76. By turning of the nut 80, the spring force within the spring 82 can be varied.

Referring particularly to FIGS. 4 and 7, it can be seen that if a force was applied in a downward direction about the sleeve housing 66, that the flange 64 will be moved against the spring 82 tending to compress such. If the spring 82 is extended (non-compressed), the force then required to compress the spring 82 would be less than if the spring 82 was precompressed by turning of nut 80. The more the nut 80 is tightened, the greater the force required to compress the spring 82.

Mounted on the shaft 62 is a pulley 86. Connecting with the pulley 86 is a second drive belt 88. Second drive belt 88 connects with drive wheel pulley 90. The drive wheel pulley 90 is fixedly secured to the drive wheel 92. Drive wheel 92 is rotationally mounted on axle 94.

One end of the axle 94 is fixedly mounted onto the first pivot arm 96. The opposite end of the axle 94 is fixedly mounted onto a second pivot arm 98. The first pivot arm 96 is pivotally mounted by means of a pivot pin 100 to the frame member 50. The second pivot arm is pivotally mounted by means of pivot pin 102 to the frame member 44. The pins 100 and 102 are actually secured by being welded to their respective frame members 50 and 44. The pivot axis, which is formed by the pins 100 and 102 which are in axial alignment, is represented in FIG. 5 as the letter "F."

The outer end of the pivot arm 98 is in continuous contact with a coil spring 104. The outer end of the coil spring 104 is secured to a spring hanger 106. The spring hanger 106 is fixedly mounted on the elongated frame member 44. It is to be understood that a similar spring (not shown) is to connect with the arm 96 in the same manner utilizing a spring hanger (also not shown). It is to be noted that the use of these springs and spring hangers are not shown within FIG. 3, otherwise they would hinder the observing of the remaining portion of the structure.

Connected by a bracket 108 to the frame member 44 is a cylinder 110. Movably mounted within the cylinder 110 is a piston 112. The piston 112 is attached to piston rod 114. It is to be noted that the piston rod 114 extends entirely through the cylinder 110. Within the cylinder 110 is a fluid which can be either an oil or gas so that the piston 112 and the cylinder 110 function as a conventional energy damper. The outer end of the piston rod 114 is mounted onto clamp 116. The clamp 116 is connected through threaded fastener 118 to linkage arm 30.

In a similar manner, it is to be understood that there will be a cylinder 120 which is to be secured by a bracket (not shown) to the frame member 50. Within the cylinder 120 is to be located a piston which is connected to a piston rod 122. The piston rod 122 is connected through a clamp 124, which is connected to fastener 126. The fastener 126 is connected to the linkage member 132. Each of the clamps 116 and 124 can be loosened so that the position of the piston rods 114 and 132 can be adjusted in respect to their respective clamp 116 and 124. Normally this adjustment is to be so that the piston 112 will never "bottom out" during even the most severe operation (bouncing) of the motor assisting device 10.

During operation of the motor assisting device 10 of this invention, there will be incurred undesirable forces by the driving wheel 92. As the driving wheel 92 is moved upward off the road's surface, this force will inherently be transmitted to the mounting frame composed of members 44 and 50. Damping of this force will therefore occur through the pistons located within the cylinders 110 and 120.

Additionally, the bounce force will cause the pivot arms 96 and 98 to be pivoted. These pivot arms will compress their respective springs (such as spring 104), which further functions to damp the bounce energy. The springs, such as spring 104, exert a continuous bias tending to locate the arms 96 and 98 at their lowermost position.

As the wheel 92 is raised, the belt 88 tends to become slack. Because of the spring 82, the sleeve housing 66 is pivoted about point "B," which is its point of connection to the arms 68 and 70. The arms 68 and 70 also pivot at their point of connection to the mounting frame. The pivoting action maintains the distance "X" from point "A" to point "D" constant and also the distance "Y" from point "A" to point "E"-constant. As a result, there is no slack in belt 88, nor in belt 58. This structure to maintain taut the belts 88 and 58 is referred to as tensioner means within the claims.

When the wheel 92 returns to its lower position, the sleeve housing 66 again pivots back with respect to the arms 68 and 70 and also the arms 68 and 70 pivot back to their previously established position. The amount of pivoting can be readily observed in comparing FIGS. 4 and 5.

What is claimed is:

1. In combination with a vehicle having a plurality of wheels, a frame connecting said wheels, said wheels comprising a leading wheel and a trailing wheel, a power assisting assembly for said vehicle comprising:
   a motor;
   a mounting frame, said motor being mounted on said mounting frame;
   a driving wheel rotatably driven through a driving belt assembly by said motor, said driving wheel being longitudinally spaced rearwardly of said trailing wheel, said driving wheel being mounted by a suspension system on said mounting frame; and tensioner means mounted on said mounting frame for continuously maintaining taut said driving belt assembly.

2. The combination as defined in claim 1 including:
   damping means, said damping means being mounted between said mounting frame and said frame of said vehicle, said damping means to absorb energy created during bouncing movement of said power assisting assembly relative to the surface upon which it is supported.

3. The combination as defined in claim 2 wherein:
   said suspension system permitting limited movement of said driving wheel relative to said mounting frame, said driving belt assembly including an idler pulley, a first driving belt connected between said motor and said idler pulley, a second driving belt connected between said driving wheel and said idler pulley, said idler pulley being mounted by mounting means on said mounting frame, said mounting means being included within said tensioner means, said idler pulley being capable of limited movement relative to said mounting frame.

4. The combination as defined in claim 3 wherein said tensioner means further includes:
   said mounting means including biasing means, said biasing means exerting a continuous force tending to locate said idler pulley at the greatest distance away from said mounting frame to thereby maintain taut both said first belt and said second belt.

5. The combination as defined in claim 4 wherein:
   said suspension system comprises a pivotable arm assembly, said driving wheel being attached to one end of said pivotable arm assembly with the other end of said pivotable arm assembly being pivotally connected to said mounting frame, spring means mounted on said mounting frame, said spring means being connectable to said pivotable arm assembly and is to be compressible during movement of said pivotable arm assembly.

6. The combination as defined in claim 2 wherein:
   said damping mechanism comprising a hydraulic piston and cylinder assembly, the initial position of said piston within said cylinder to be adjustable.

* * * * *